(12) United States Patent
Kawagishi et al.

(10) Patent No.: US 7,120,846 B2
(45) Date of Patent: Oct. 10, 2006

(54) DATA TRANSMISSION DEVICE, DATA RECEIVING DEVICE, DATA TRANSFER DEVICE AND METHOD

(75) Inventors: Takeshi Kawagishi, Kawasaki (JP); Kiyoshi Sudo, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 09/734,702

(22) Filed: Dec. 13, 2000

(65) Prior Publication Data

US 2001/0005897 A1   Jun. 28, 2001

(30) Foreign Application Priority Data

Dec. 14, 1999   (JP) ................................. 11-355187

(51) Int. Cl.
*H04I 1/18* (2006.01)
(52) U.S. Cl. ..................................... 714/748
(58) Field of Classification Search ........ 714/748–751, 714/746, 18, 712
See application file for complete search history.

(56) References Cited

U.S. PATENT DOCUMENTS

| | | | |
|---|---|---|---|
| 4,142,080 A | 2/1979 | Takahashi | 200/86.5 |
| 5,502,733 A * | 3/1996 | Kishi et al. | 714/748 |
| 5,844,918 A * | 12/1998 | Kato | 714/751 |
| 6,543,014 B1 * | 4/2003 | Okuyama et al. | 714/712 |
| 6,728,918 B1 * | 4/2004 | Ikeda et al. | 714/748 |

FOREIGN PATENT DOCUMENTS

| | | |
|---|---|---|
| JP | 60-81667 | 5/1985 |
| JP | 60-144866 | 7/1985 |
| JP | 60-247760 | 12/1985 |
| JP | 2-216522 | 8/1990 |
| JP | 10-117193 | 5/1998 |

\* cited by examiner

*Primary Examiner*—Shelly Chase
(74) *Attorney, Agent, or Firm*—Staas & Halsey LLP

(57) ABSTRACT

A data transfer device having a data transmission side to receive an error detection signal transmitted thereto when an error is detected within data transmitted therefrom. It is decided whether to receive an error detection signal relating to the data transmitted therefrom and retransmission of the data is controlled depending upon the result of this determination. A data receiving side to detect an error in data transmitted thereto, to detect whether there is an error in the data received and, if there is an error in the data received, the data receiving side is capable of receiving data which generates an error detection signal depending upon the degree of the error. Therefore, when an error is detected from transfer data received, it will be possible to re-transfer the data using the address data for the transmission source.

13 Claims, 15 Drawing Sheets

DATA TRANSMISSION DEVICE, DATA RECEIVING DEVICE, DATA TRANSFER DEVICE AND METHOD

CROSS REFERENCE TO RELATED APPLICATIONS

This application is based upon and claims priority of Japanese Patent Application No. 11-355187, filed Dec. 14, 1999, the contents of which are incorporated herein by reference.

BACKGROUND OF THE INVENTION

1. Field of the Invention

This invention relates to a data transmission device and data receiving device together with a data transfer device and method resulting from the combination thereof.

2. Description of the Related Art

In recent years, limitations on increased speed for computers having a single processor type configuration have resulted in the recommendation of numerous types of computer systems with multi-processor type configurations.

In multi-processor systems, data communication is performed between processor modules. Operation of overall systems has been brought to a halt when communicating data due to errors in the data which indicate the processor address of the data transmission destination. Such data errors make it impossible to restore this destination address. This makes continued overall system operation impossible, even operation of the processors that are not related to data communication. Yet, the cessation of large scale systems, such as host servers, upon every occurrence of such aforementioned errors may present a severe obstacle to businesses.

In addition, because the cessation of system operation alone makes it impossible to discover the source of the error, it can also be the reason for repeated occurrences of the same error.

SUMMARY OF THE INVENTION

The objective of this invention is to solve such problems as described above, by providing a data transmission device and data receiving device together with a data transfer device and a method resulting from the combination thereof, which is capable of preventing the overall system from ceasing to operate.

Another objective of this invention is to provide a data transmission device and data receiving device together with a data transfer device and a method resulting therefrom, which is capable of preventing the reoccurrence of errors when errors have occurred during data transmission by discerning the cause of those errors.

To achieve the above objectives, the data transfer device of the present invention comprises a data transmission side which possesses the capability of receiving an error detection signal transmitted thereto when an error is detected within data transmitted therefrom, means to determine whether to receive an error detection signal relating to the data transmitted therefrom, and means to control the retransmission of the above data depending upon the result of this determination.

The data transfer device of the present invention further comprises a data receiving side which posses the capability to detect an error in data transmitted thereto, to detect whether or not there is an error in the data received and, if there is an error in the data received, the data receiving side comprises means to receive data which generates an error detection signal depending upon the degree of the error.

By adopting such a configuration as described above, even when an error is detected from transfer data received, it will be possible to re-transfer the data using the address data for the transmission source.

DESCRIPTION OF THE PREFERRED EMBODIMENTS

The preferred embodiments of the invention are explained in detail below referring to the figures.

Figure 1:
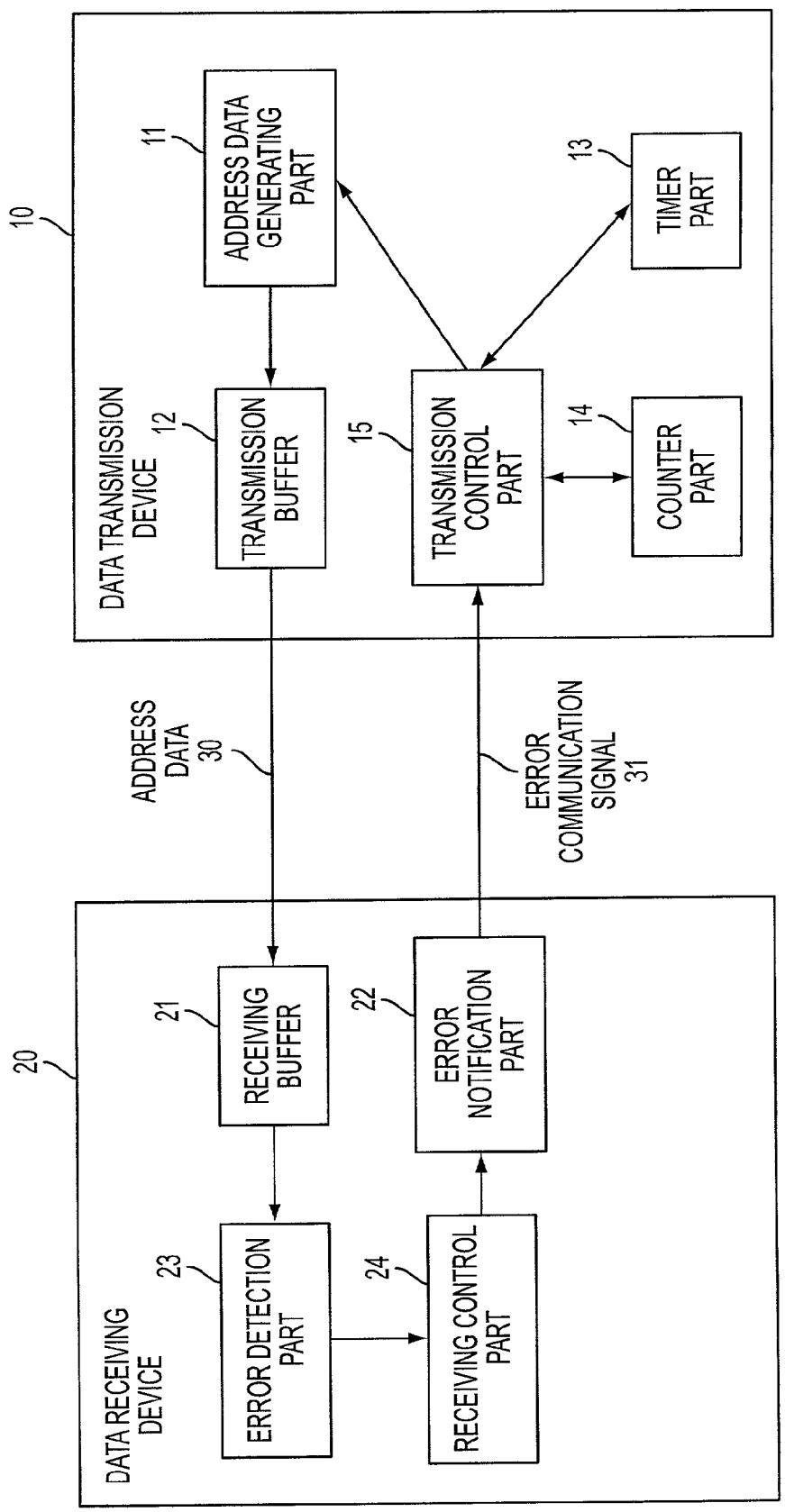
FIG. 1 is a block diagram showing a configuration of a data transfer device according to an embodiment of the invention.

FIG. 1 is a block diagram showing a configuration of a data transfer device according to an embodiment of the invention.

In this figure, element 10 is a data transmission device, element 20 is a data receiving device and data transfer is performed therebetween. However, the data transmission device 10 transmits address data 30 and receives error communication signal 31 responsive thereto when an error is detected in the transmitted data.

The data transmission device 10 comprises an address data generating part 11, a transmission buffer 12, a timer part 13, a counter part 14 and a transmission control part 15.

The address data generating part 11 is a circuit to generate address data including the address of the transmission destination and the address of the transmission source for the transferred data in cell, packet, frame, or some other format, and the transmission buffer 12 holds address data from the address data generating part 11.

The timer part 13 starts a timer count upon being reset in response to a command from transmission control part 15 (as described later) and, after a predetermined period of time, interrupts transmission control part 15.

Furthermore, the predetermined period of time in which the timer part 13 interrupts transmission control part 15 is determined in consideration of the address data transmission time determined, depending on the distance and performance along the transmission line connecting the data transmission device 10 and the data receiving device 20 and the error communication signal arrival time.

The counter part 14 is a counter that counts the number of retransmissions of address data 30 by the data transmission device 10 to the data receiving device 20. The counter part 14 is cleared once address data 30 is received by the data receiving device 20 and its count is updated in response to the detection of a transfer failure of address data 30.

The transmission control part 15 controls transmission of the address data held in the transmission buffer 12 as address data 30, orders the timer part 13 to begin and receives an interrupt from the timer part 13 and an error communication signal from the data receiving device 20 and, thus, controls retransmission of address data 30 in response to the timing of receiving the interrupt and the error communication signal.

When the timing of the interrupt from the timer part 13 and the timing of receiving error communication signal 31 from the data receiving device 20 match, the transmission control part 15 determines that the transfer of address data 30 has failed and, together with controlling retransmission of the address data held in the transmission buffer 12 as address data 30, starts the timer part 13 and updates the count held in the counter part 14.

When the timing of the interrupt from the timer part 13 and the timing of receiving error communication signal 31 from the data receiving device 20 do not match, or if error communication signal 31 from the data receiving device 20 is not received, the transmission control part 15 determines that the transfer of address data 30 has been successful and the count of the counter part 14 is cleared.

Moreover, if transfer failure is repeated, the aforementioned data retransmission process is executed repeatedly. However, when the count of the counter part 14 reaches a set value, transmission of the address data 30 to the data receiving device 20 is no longer performed and it is determined that the data receiving device 20 is malfunctioning, thus stopping the system.

The data receiving device 20 comprises a receiving buffer 21, an error detection part 23, an error notification part 22 and a receiving control part 24.

The receiving buffer 21 stores address data 30 received from the data transmission device 10 in a sequence and the error detection part 23 detects whether there is an error in the address data stored in the receiving buffer 21.

The error detection part 23 includes an ECC circuit, which performs both a detection and correction of errors, and a detection signal output circuit and, when it is possible to correct errors in the data received, the data obtained from correcting the data received (i.e., the corrected, received data) is output to the receiving control part 24. When it is not possible to correct the error in the data received, another detection is performed to determine whether there is an error in the portion of the data which relates to the transmission source address data (master ID) within the data received.

When there are no errors in the data received relating to the transmission source address data, the error detection part 23 outputs the transmission source address data to the receiving control part 24. When it is possible to correct errors in the transmission source address data of the data that is received, the error detection part 23 outputs the transmission source address data obtained from performing correction on the data received (i.e., the corrected transmission source address data) to the receiving control part 24. Only when it is impossible to correct errors in the transmission source address data master ID of the data received, does the error detection part 23 generate an error detection signal and output the error detection signal to the receiving control part 24.

The error notification part 22 is a circuit which generates the error communication signal 31 only when it clarifies, as a result of detection, that there is an error which cannot be corrected in the data received but there are no errors which cannot be corrected in the transmission source address data (master ID).

The receiving control part 24 stops the system in response to the error detection signal from the error detection part 23 and controls the receiving control part 24 to order the error notification part 22 to generate and output an error communication signal 31 to the data transmission device 10.

Below is a description of the operation of a data transfer device of a first embodiment of the present invention, possessing the above-described configuration, referring to FIG. 2 and FIG. 3.

Figure 2:
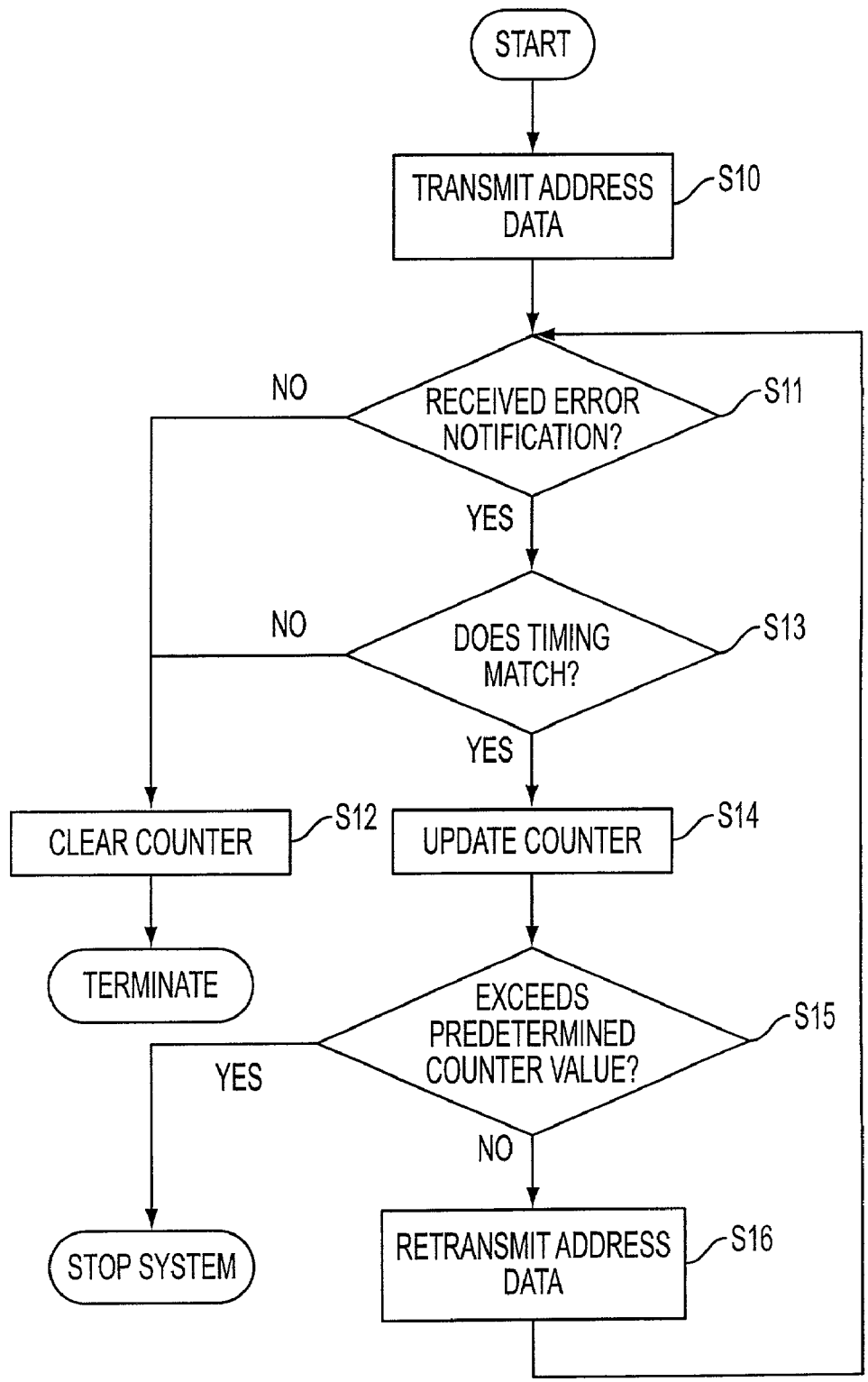
FIG. 2 is a flowchart showing an operation of the data transfer device of an embodiment of the present invention.

FIG. 2 is a flowchart showing an operation of the data transfer device of an embodiment of the present invention.

At S10, the transmission control part 15 transmits the address data generated at the address data generating part 11 and held in the transmission buffer 12 as address data 30 and also the start of the timer part 13.

Next, at S11, the transmission control part 15 determines whether it has received error communication signal 31 and, in the case where the transmission control part 15 has not received error communication signal 31 from the data receiving device 20, and the transmission of address data 30 is being performed normally, the operation continues to S12 and clears the count of the counter part 14 to 0, thus terminating the process.

However, if at S11 the transmission control part 15 receives error communication signal 31 from the data receiving device 20, the operation proceeds to S13 where it compares the timing of receiving error communication signal 31 from data the receiving device 20 and the timing of receiving the interrupt from the timer part 13 to the transmission control part 15 when predetermined period of time expires, and determines whether they match. If the timing of receiving the interrupt from the timer part 13 and that of the error communication signal 31 from the data receiving device 20 do not match, the operation determines that the transmission of address data 30 has been performed normally and continues to S12 and clears the count of the counter part 14 to 0, thus terminating the process.

Furthermore, if the timing of receiving the interrupt from the timer part 13 and the receiving of error communication signal 31 from the data receiving device 20 do match, it is determined that the transfer of address data 30 has failed and the operation continues to S14.

At S14, the count of the counter part 14 is updated by adding 1 thereto. At S15, it determined whether the count of the counter part 14 has reached a set value and, if the count of the counter part 14 has reached the set value, the transmission of address data 30 to the data receiving device 20 is no longer performed and it is determined that the data receiving device 20 is malfunctioning, thus stopping the system. However, if the count has not exceeded the set value, the operation continues on to S16.

At S16, the re-transmission of the address data held in the transmission buffer 12 as address data 30 is stopped and the restart of the timer part 13 is stopped and the operation returns to S11.

Figure 3:
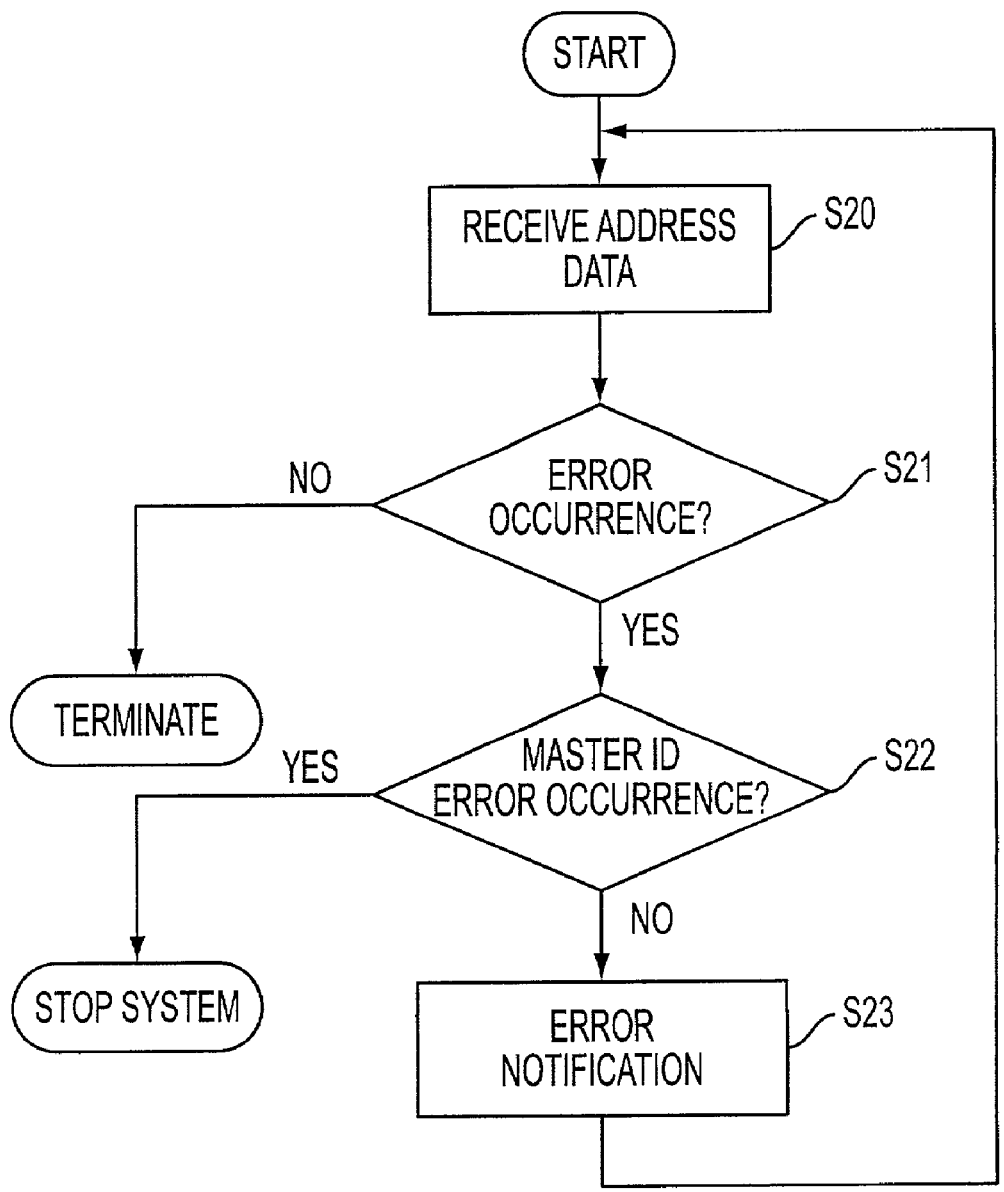
FIG. 3 is a flowchart showing an operation of the data transfer device of an embodiment of the present invention.

FIG. 3 is a flowchart showing an operation of the data transfer device of an embodiment of the present invention.

At S20, the data receiving device 20 stores address data 30 transmitted from the data transmission device 10 in the receiving buffer 21. At S21, it determined whether there is an error in the address data stored by the error detection part 23 in the receiving buffer 21. If there are no errors that cannot be corrected in the address data, the error detection part 23 outputs either the data received as it is or, if necessary, the data obtained from performing a correction on the data received to receiving control part 24 and terminates the process. If there is an error that cannot be corrected in the data received, the operation continues on to S22.

At S22, it is determined whether there is an error relating to the data for the transmission source address data (master ID) of the data received. If there is an error that cannot be corrected in the transmission source address data (master ID) of the data received, the data received is either handled as a retry impossible error which stops the system or, if it is possible to correct the error in the transmission source address data (master ID), the operation continues on to S23.

At S23, the error notification part 22 generates and outputs error communication signal 31 and the operation returns to S20 to repeat the above-described address data receiving process.

In this way, according to this embodiment, even if a communication error occurs while transmitting data between the data transmission device 10 and the data receiving device 20, if the address data (master ID) of the data transmission device 10 is not lost, by simply performing a retry, errors can be avoided. It is also possible to limit system stoppage due to the occurrence of errors to a minimum.

Figure 4:
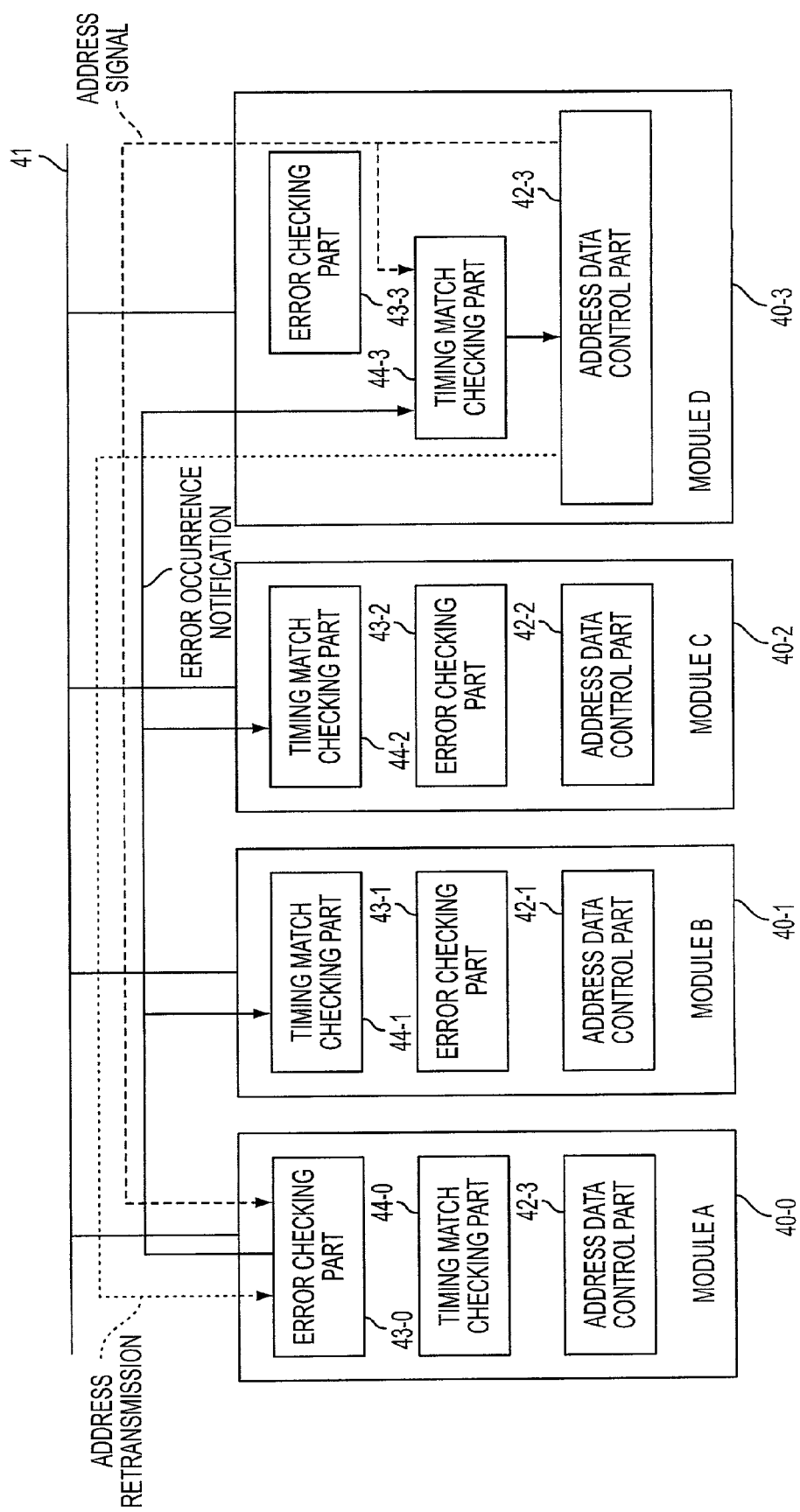
FIG. 4 is a block diagram showing a configuration of multiprocessor-type system of another embodiment of the present invention.

FIG. 4 is a block diagram showing a configuration of multiprocessor-type system of another embodiment of the present invention.

In FIG. 4, numbers 40-0 to 40-3 represent modules A, B, C and D, respectively, which have identical configurations, number 41 represents a bus connecting modules 40-0 to 40-3 and thus constructs a multiprocessor type system through the mutual connection of these multiple modules.

For each module 40-0 to 40-3, 42-0 to 42-3 represent an address data control part which transmits to address data bus 41, 43-0 to 43-3 perform an error check on the address data received from address data bus 41 and comprise the error checking parts which transmit notification of respective error occurrences to address data bus 41. 44-0 to 44-3 compare the timing of receiving the error occurrence notification and the timing of the address data transmission and function as timing match checking parts which determine address data retransmission. The other functions for each module are abridged on FIG. 4.

In FIG. 4, the operation of a second embodiment is described with module D40-3 as the address data transmission source module, and model A40-0 as the address data transmission destination module.

First, when the address data transmission source module D (40-3) transmits an address signal from the address data control part 42-3, along address data bus 41, to transmission destination module A40-0, the error checking part 43-0 receives the address signal into its receiving buffer.

The error checking part 43-0 determines whether an error has occurred in the address signal and, if no communication error has occurred and the transmission of the address signal has been performed normally, the error checking part 43-0 handles successive data communication. However, if it is determined that an error has occurred in the address signal, the error checking part 43-0 outputs an error occurrence notification to the other modules (40-1 to 40-3).

Modules 40-1 to 40-3, which are those other than module 40-0, which received the error occurrence notification, compare the timing of receiving the error occurrence notification and the timing of the transmission of the address signal transmitted from their own address data control part using timing match checking parts 44-1 to 44-3, respectively, and determine whether the timing for both is within a predetermined specified interval.

The specified interval between the transmission timing of the address signal and receiving the error occurrence notification for this address signal is predetermined for each module and this determination depends upon the length and performance of address data bus 41, which interconnects each of the modules.

Because the error occurrence notification output from module 40-0 is a notification regarding the address signal output from module 40-3, the error occurrence notification is determined not to match the specified interval of the timing match checking parts 44-1 and 44-2 but, rather, is determined to match the specified interval at timing match checking part 44-3.

Therefore, timing match checking parts 44-1 and 44-2 of module 40-1 and 40-2, respectively, do not handle error occurrence notifications received. Rather, the timing match checking part 44-3 of module 40-3 requests the retransmission of the address signal to the address data control part 42-3 and the address data control part 42-3 retransmits the address signal.

Thus, according to the second embodiment, even if communication errors occur during address data transmission between modules, the transmission source can also perform transmission retries simply by performing error notification to the module and, thereby, limiting system stoppages due to the occurrence of communication errors to a minimum.

Figure 5:
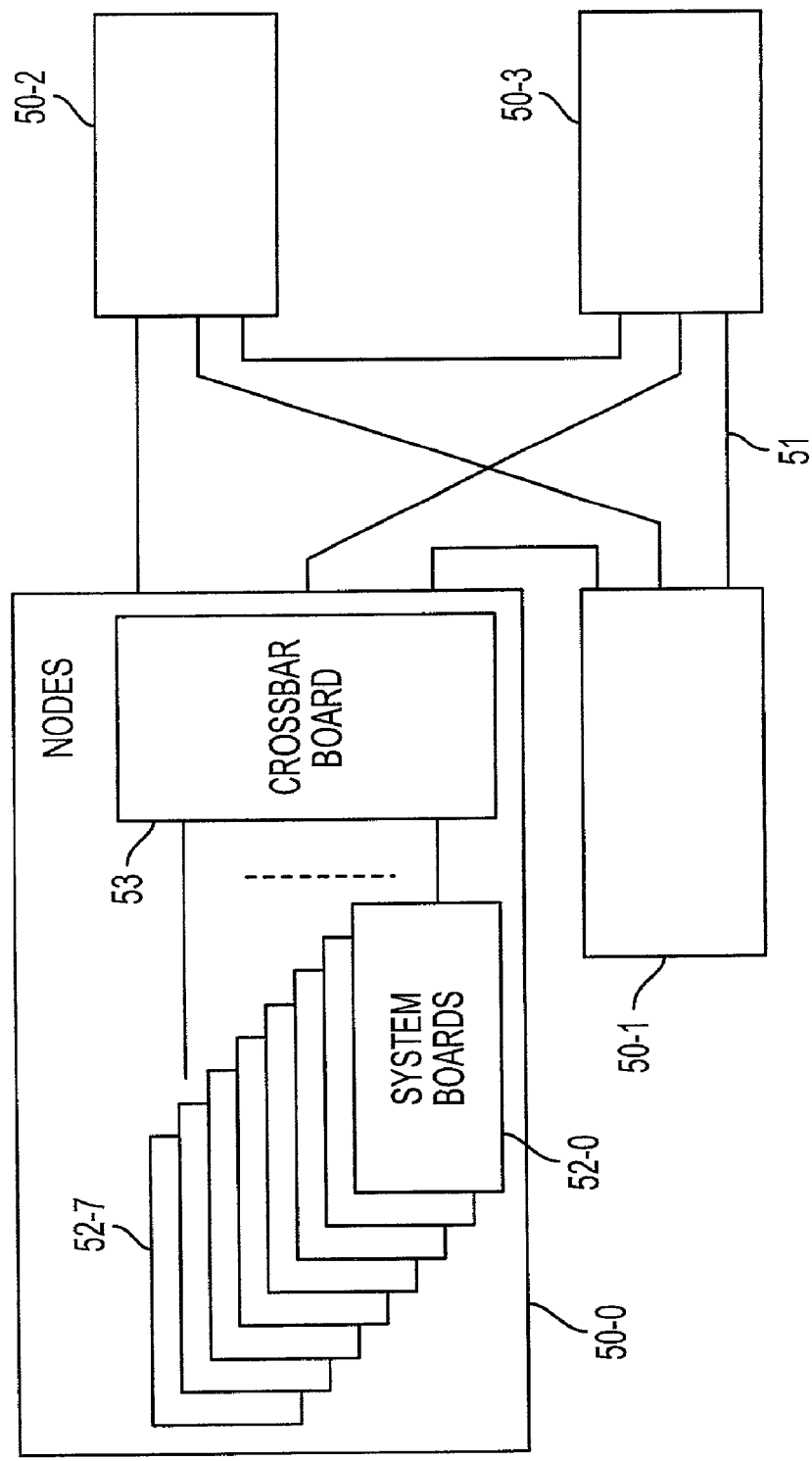
FIG. 5 is a block diagram showing a configuration of a computer system for which the present invention applies.

FIG. 5 is a block diagram showing a configuration of a computer system for which the present invention applies.

In FIG. 5, 50-0 to 50-3 represent the nodes of a multiprocessor-type configuration. Node 50-0, node 50-1, node 50-2, and node 50-3 are nodes of the same cabinet configuration, and 51 is a cable.

The computer system of this embodiment is a cluster-type parallel computer system utilizing a configuration in which four nodes, node 50-0, node 50-1, node 50-2 and node 50-3 are mutually interconnected through cable 51. However, the explanation of the system configuration for this embodiment shall be limited only to the aspects which relate to the present invention.

Each node includes multiple system boards 52-0 to 52-7 not exceeding 8, and a crossbar board 53 which connects the multiple system boards.

The crossbar board 53 includes an address data bus, a cache status bus, a data control bus and a data bus. While all system boards 52-0 to 52-7 are mutually interconnected through these busses, all nodes 50-0 to 50-3 are also mutually interconnected through these busses.

Figure 6:
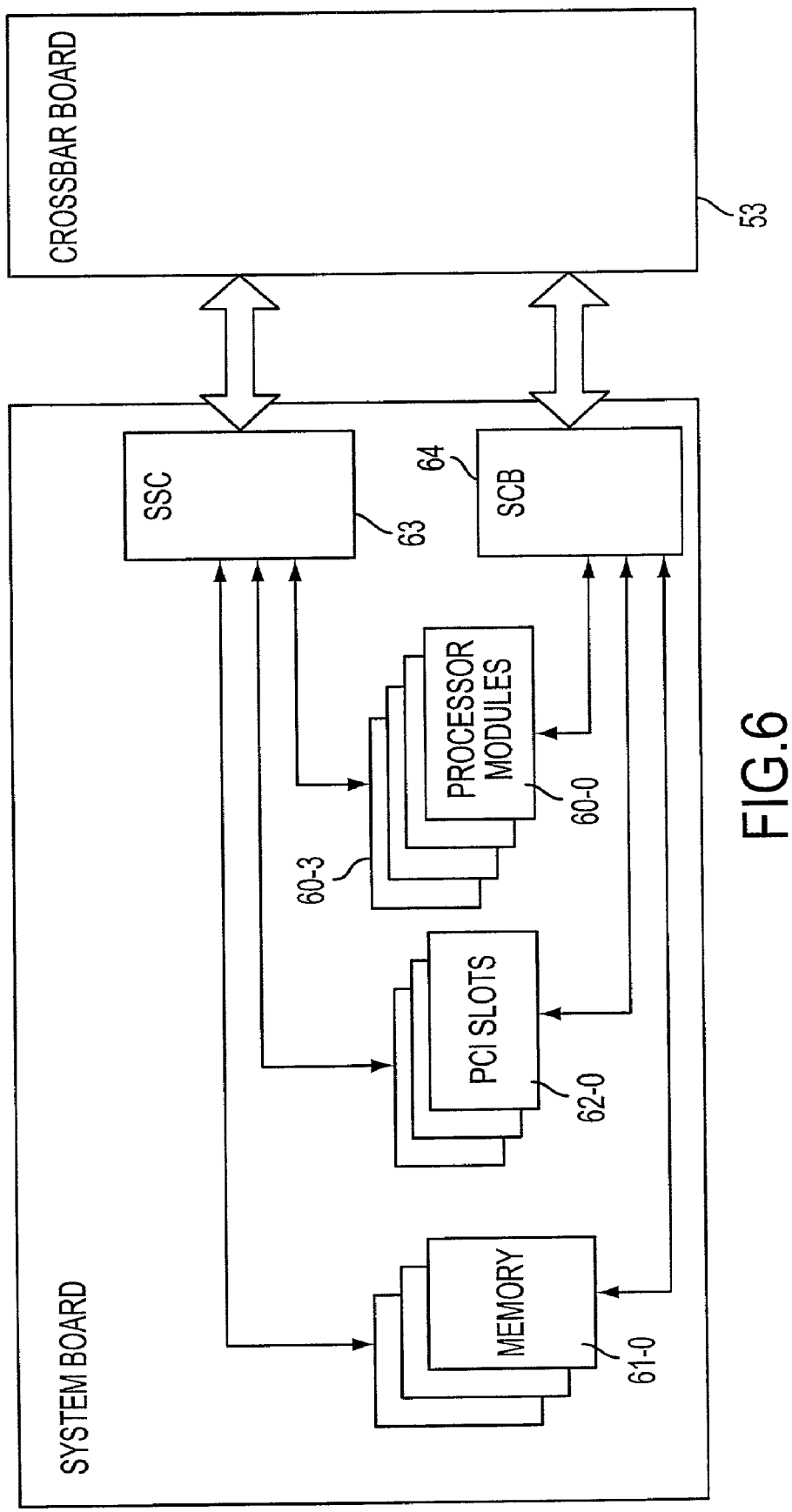
FIG. 6 is a block diagram showing a configuration of a system board for the present invention.

FIG. 6 is a block diagram showing a configuration of a system board for the present invention.

As indicated in FIG. 6, the system boards each include four processor modules 60-0 to 60-3, four memory modules 61-0 to 61-3, three PCI slots 62-0 to 62-2, and a snoop system controller SSC 63 and a system crossbar SCB 64 which connects these elements.

The system board for this embodiment is a multiprocessor-type system which adopts a configuration in which four processor modules: processor module 60-0, processor module 60-1, processor module 60-2, and processor module 60-3 are mutually interconnected through the processors SSC 63 and SCB 64. However, the explanation of the system configuration for this embodiment shall be limited to the aspects which relate to the present invention.

The four memory modules 61-0 to 61-3 each include a main memory, which holds programs and data, and a main memory control circuit. The main memories are connected to SSC 63 and SCB 64 through a main memory circuit.

The four memory modules 61-0 to 61-3 are interleaved in units of 64 Mbits. This unit of interleaving is determined according to the cache memory line size within the processor modules 60-0 to 60-3.

In addition, each of the modules 61-0 to 61-3 use an SDRAM and it is possible to input data synchronized with an externally input clock signal. Because the SDRAM can operate continually at a frequency of 100 MHz or more, the SDRAM may be used to speed up the operation of the computer system. Moreover, the memory configuration, interleave size and other aspects are not defined by the invention.

Each processor module 60-0 to 60-3 comprises a CPU to read program commands from the main memory in sequence and to execute those commands in sequence, a cache memory to store partial copies of data from the main memory, a cache control circuit to control that cache memory and other processor modules, memory modules and data transfer devices which perform data communication between expansion modules in PCI slots.

Each of the PCI slots 62-0 to 62-2 is available to expand external interfaces and it is possible to construct a large scale system by installing different types of cards (expansion modules) in these slots.

The snoop system controller SSC 63 is a control circuit comprising a reciprocal link network capable of transferring addresses in parallel, which controls using a snoop cache format adopted to guarantee consistency in the cache memory contents within the processor module.

System crossbar SCB 64 is a data bus comprising a reciprocal link network capable of parallel data transfer.

Figure 7:
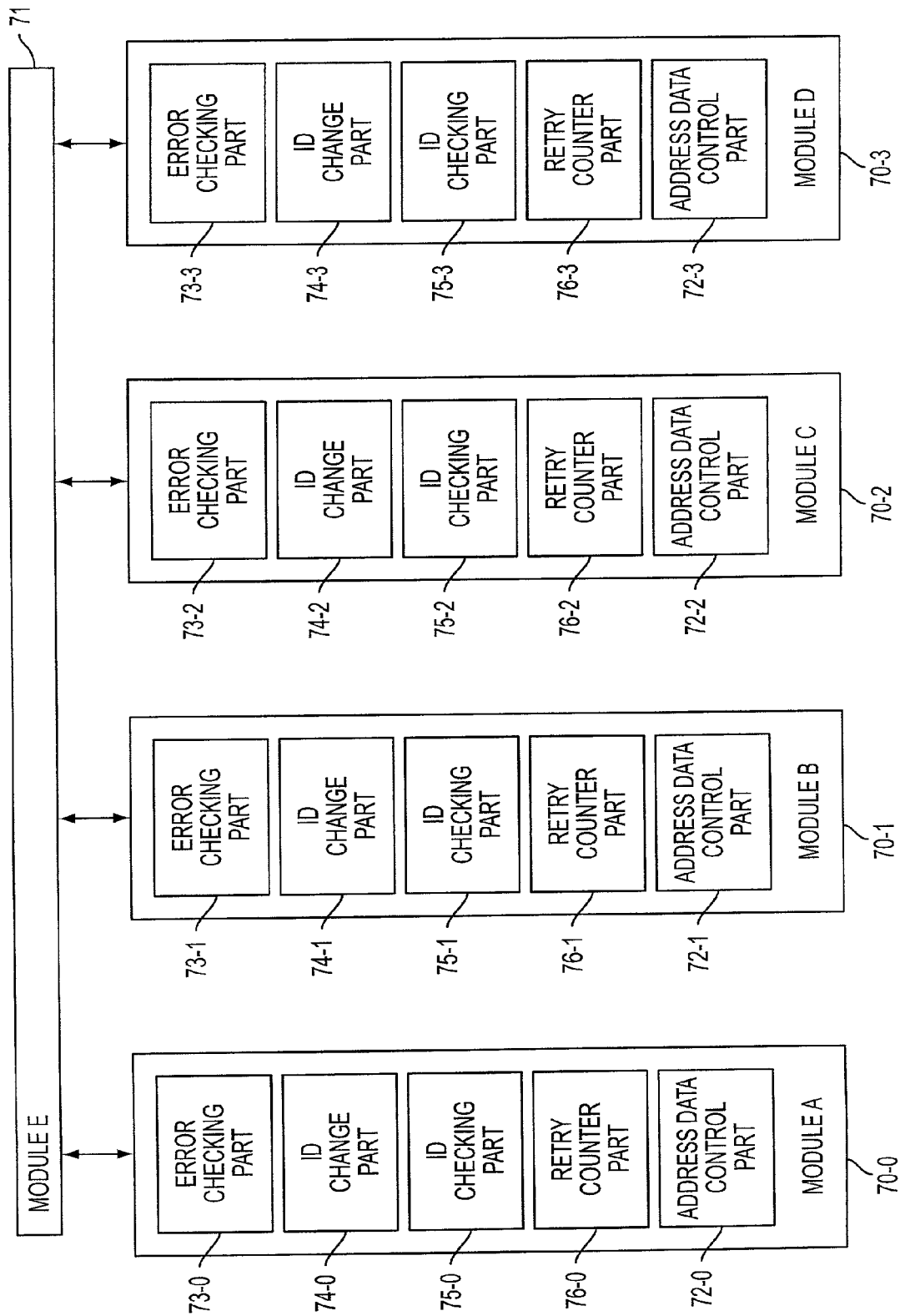
FIG. 7 is a block diagram showing a configuration of the multiprocessor system of an embodiment of the present invention.

FIG. 7 is a block diagram showing a configuration of the multiprocessor system of an embodiment of the present invention.

Figure 8:
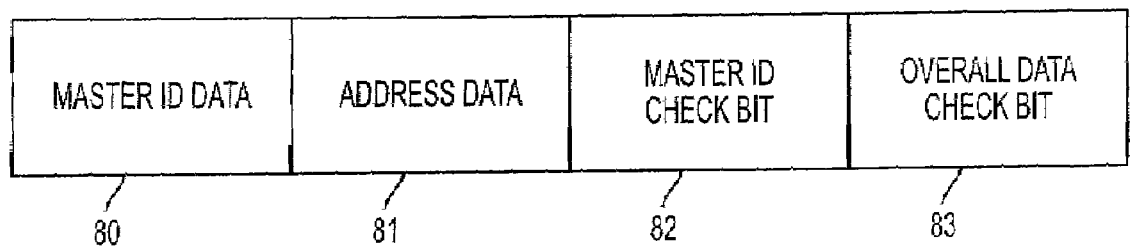
FIG. 8 is a diagram showing a data format at a point of address information data transmission of an embodiment of the present invention.

FIG. 8 is a diagram showing a data format at a point of address information data transmission of an embodiment of the present invention.

In FIG. 7, 70-0 to 70-3 are modules A, B, C and D having an identical configuration and 71 is module E, which mutually interconnects modules 70-0 to 70-3 and monitors the status of each module. Accordingly, module E constructs a multiprocessor system by mutually interconnecting multiple modules.

Moreover, modules 70-0 to 70-3 are compatible with processor modules 60-0 to 60-3 as shown in FIG. 6 and comprise identical configurations as those of processor modules 60-0 to 60-3 and monitoring module 71 is compatible with snoop system controller SSC 63 of FIG. 6, and comprises an identical configuration as snoop system controller SSC 63.

Each of the modules 70-0 to 70-3 comprise address data control parts 72-0 to 72-3, error checking parts 73-0 to 73-3, ID change parts 74-0 to 74-3, ID checking parts 75-0 to 75-3 and retry counter parts 76-0 to 76-3. Other functions belonging to each module are abridged in this figure.

In FIG. 8, element 80 represents master ID data indicating the address data transmission source, 81 represents address data of the transmission destination, 82 represents a master ID check bit used to perform error checks on master ID data and 83 represents an overall data bit used to perform error checks on all the data of the address data.

Address data control parts 72-0 to 72-3 perform the transmission of address data, error checking parts 73-0 to 73-3 perform error checks on address data received from module 71 and perform transmission of error detection signals.

The error detection signal is expressed with 2 bits as "00" in the case in which an error has not occurred in the address data and, if an error has occurred in the address data as "01" if no errors have occurred in the master ID and as "10" in the case in which an error has occurred in the master ID.

ID change parts 74-0 to 74-3 perform changes in the master ID data received from module 71, ID checking parts 75-0 to 75-3 compare their own module IDs to the master ID in the address information data received from module 71 and retry counter parts 76-0 to 76-3 calculate the number of address data retransmissions.

Monitoring module 71 includes the capability to snoop (i.e., "sniff") the address data and the error detection signal transmitted from each of the modules 70-0 to 70-3 and transfer the address data to each of the modules 70-0 to 70-3.

The operation of the multiprocessor system of the third embodiment of the invention having the above configuration will now be described in reference to FIG. 9, FIG. 10 and FIG. 11.

Moreover, in the following description of this operation, the description shall be of module 70-3 as the address data transmission source module and module A70-0 as the address data transmission destination module. However, the address data transmitted from module 70-3 through the snoop control of module 71 is also transmitted to the other modules 70-1 to 70-3, operating in a manner similar to that of module A70-0.

Figure 9:
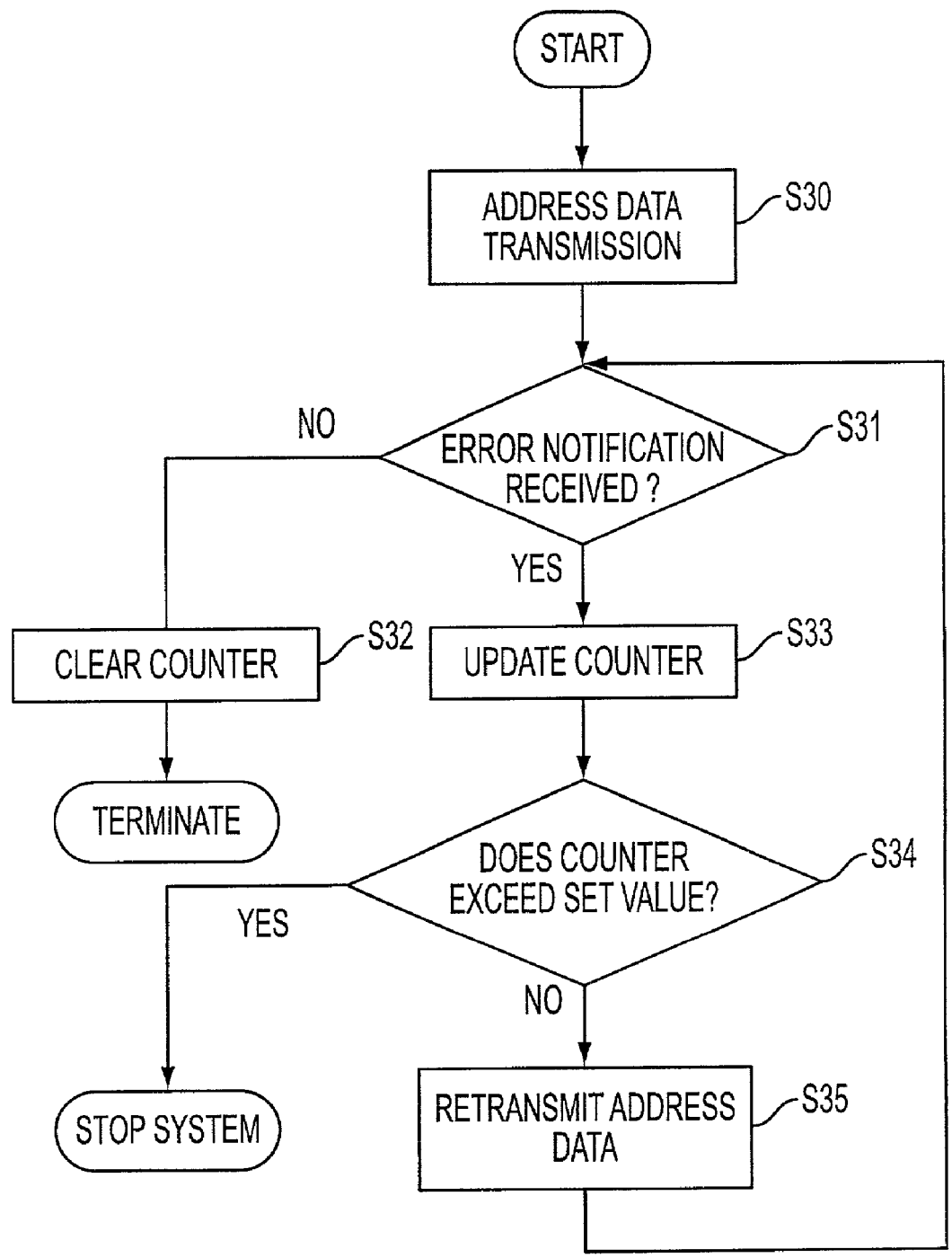
FIG. 9 is a flowchart showing an operation of an address data transmission source module of an embodiment of the present invention.

FIG. 9 is a flowchart showing an operation of an address data transmission source module of an embodiment of the present invention.

At S30, the address information data shown in FIG. 8 is transmitted to the transmission destination module A70-0 from address data control part 72-3 within the transmission source module D 70-3. At this time, an ID of "D" for the module D 70-3 is assigned to the master ID data in the address information data and an ID of "A" for module A70-0 is assigned to the address data.

Next, at S31, the address data transmission source module determines whether it received the address information data transferred from module 71 and the error detection signal "01" directed thereto from the error detection signal "01." At this time, ID checking part 75-3 compares the master ID of the address information data received from module 71 with its own ID and, if these ID's do not match, it determines that the received error detection signal "01" was an error detection signal directed thereto.

If the error detection signal "01" directed thereto from module E71 is not received and the transmission of address information data is being performed normally, the operation proceeds to S32, clears the count of retry counter part 76-3 to "0" and continues processing.

On the other hand, if at S31 the error detection signal "01" directed thereto from module E71 is not received, the operation proceeds to S33, adds 1 to the count of the retry counter part 76-3 to update the count and, at S34, determines whether the count of the retry counter part 76-3 has reached a set value. If the count of retry counter part 76-3 has reached the set value, address information data is no longer transmitted to the transmission destination module A70-0, thus determining that transmission destination module A70-0 is malfunctioning and the system is stopped. But, if the count has not exceeded the set value, the operation proceeds to S35.

At S35, the address data control part 72-3 retransmits the address information data and returns again to S31.

Figure 10:
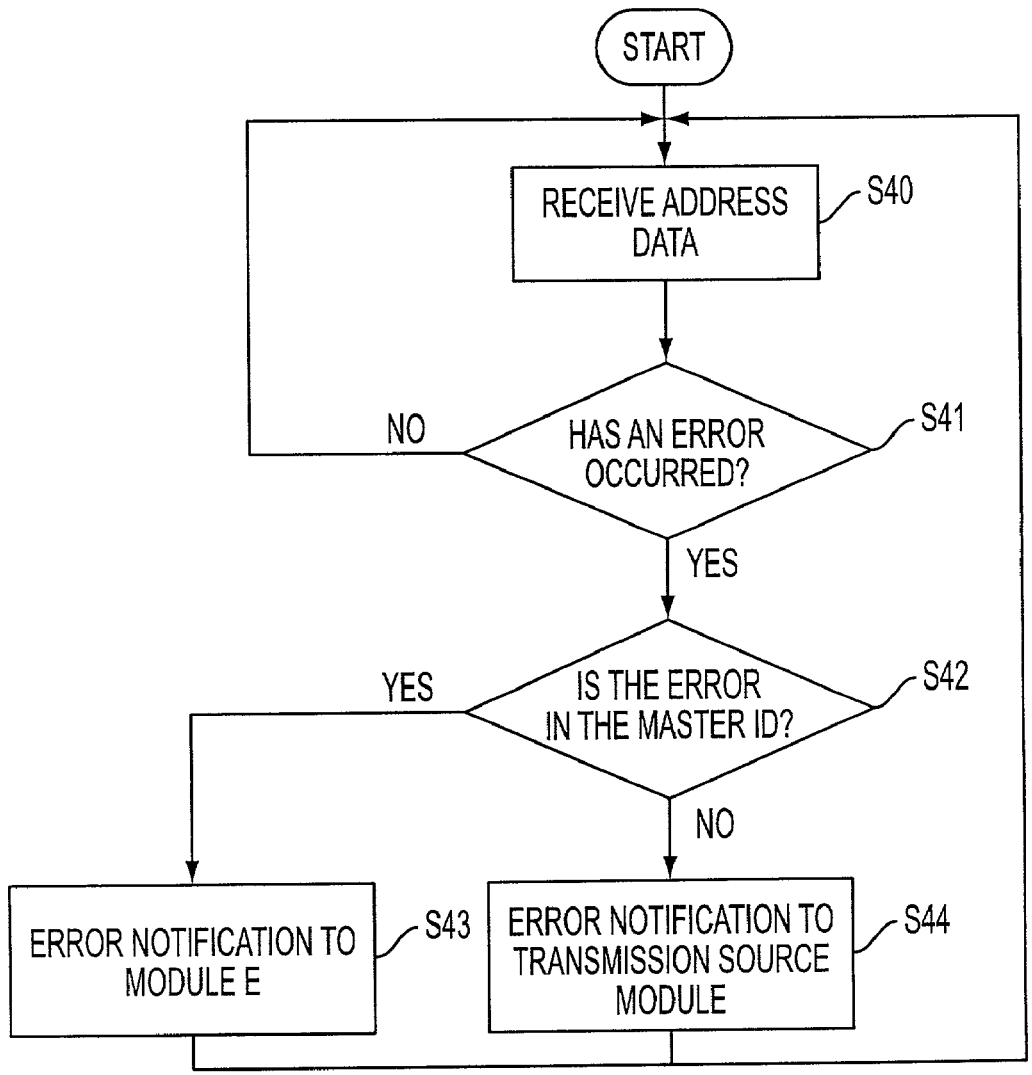
FIG. 10 is a flowchart showing an operation of an address data transmission destination module of an embodiment of the present invention.

FIG. 10 is a flowchart showing an operation of an address data transmission destination module of an embodiment of the present invention.

At S40, the address data transmission destination module receives address information data transferred from module E71. At S41, error checking part 73-0 determines whether there is an error in the address information data based on overall data check bit 83 of the address information data received. If there is no error in the address information data, the operation returns to S40 and performs post handling to determine whether the data is directed to the module and repeats the aforementioned address data receiving process. However, if there is an error in the data received, the operation proceeds to S42.

At S42, error checking part 73-0 determines whether there is an error in the master ID data of the address information data based on master ID check bit 83 in the address information data received. If there is an error in the master ID data, the operation proceeds to S43 and, if there is no error in the master ID data, the operation proceeds to S44.

At S43, the address information data received as data possessing an error is destroyed, thus, making retry impossible. Thus, ID change part 74-0 transmits master ID data 80 as changed address information data with an ID different from the IDs of modules 70-0 to 70-3 to module E71 and returns to S40 and repeats the aforementioned address data receiving process.

At S44, the error detection signal "01" is output to transmission source module 70-3 and the operation returns to S40 and repeats the aforementioned address data receiving process.

Figure 11:
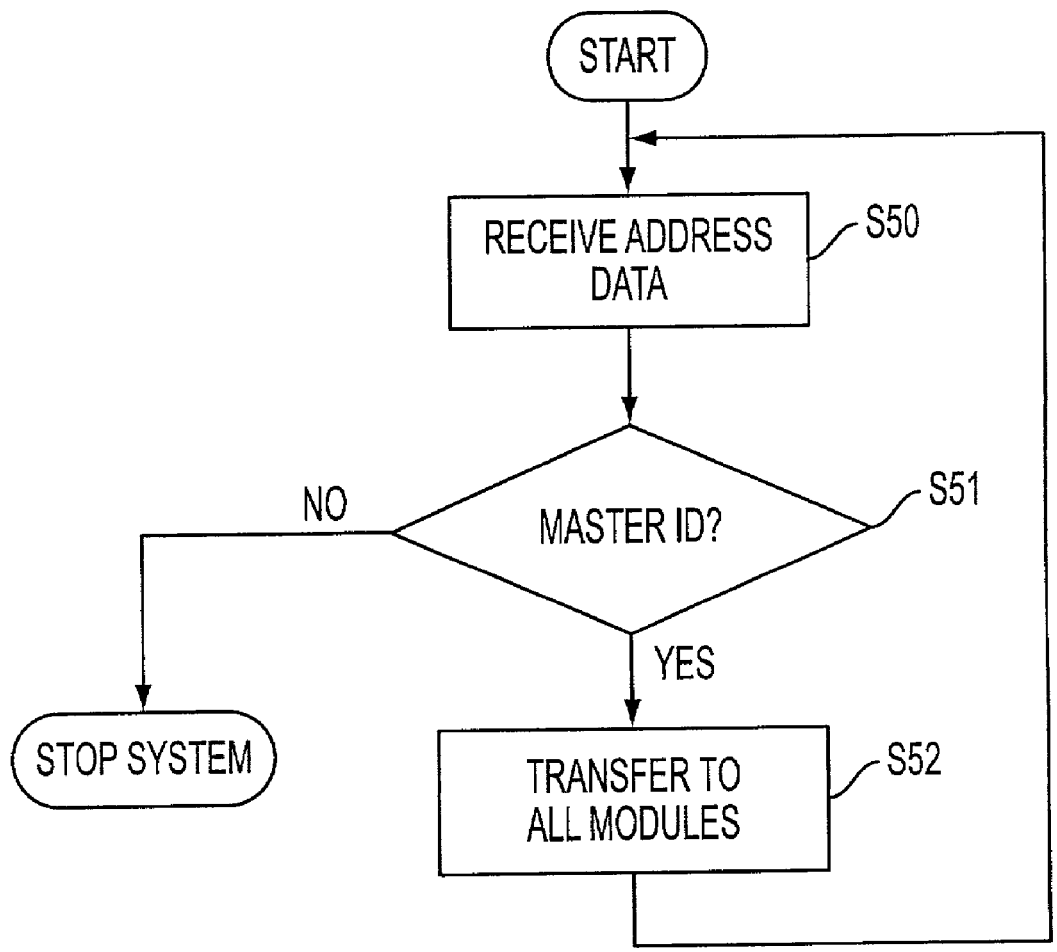
FIG. 11 is a flowchart showing an operation of a monitoring module according to an embodiment of the present invention.

FIG. 11 is a flowchart showing an operation of a monitoring module according to an embodiment of the present invention.

At S50, the monitoring module receives address information data transmitted from each of the modules 70-0 to 70-3. At S51, master ID data 80 is snooped from the address information data and it is determined whether the master ID 80 is an ID for any of modules 70-0 to 70-3.

If the master ID is an ID for any of the modules 70-0 to 70-3, the operation proceeds to S52, returns the address information data received from all modules to S50 and repeats the aforementioned address data receiving process. However, if master ID data is not an ID for any of the modules 70-0 to 70-3, it is determined whether an error that makes retry impossible has occurred in the previously transferred address information data and the system is stopped.

Accordingly, even if an error occurs in the address information data, if there is no error in the master ID data, errors can be avoided by re-transmitting at the transmission source of the address information data and it is possible to limit system stoppages due to the occurrence of communication errors to a minimum.

Figure 12:
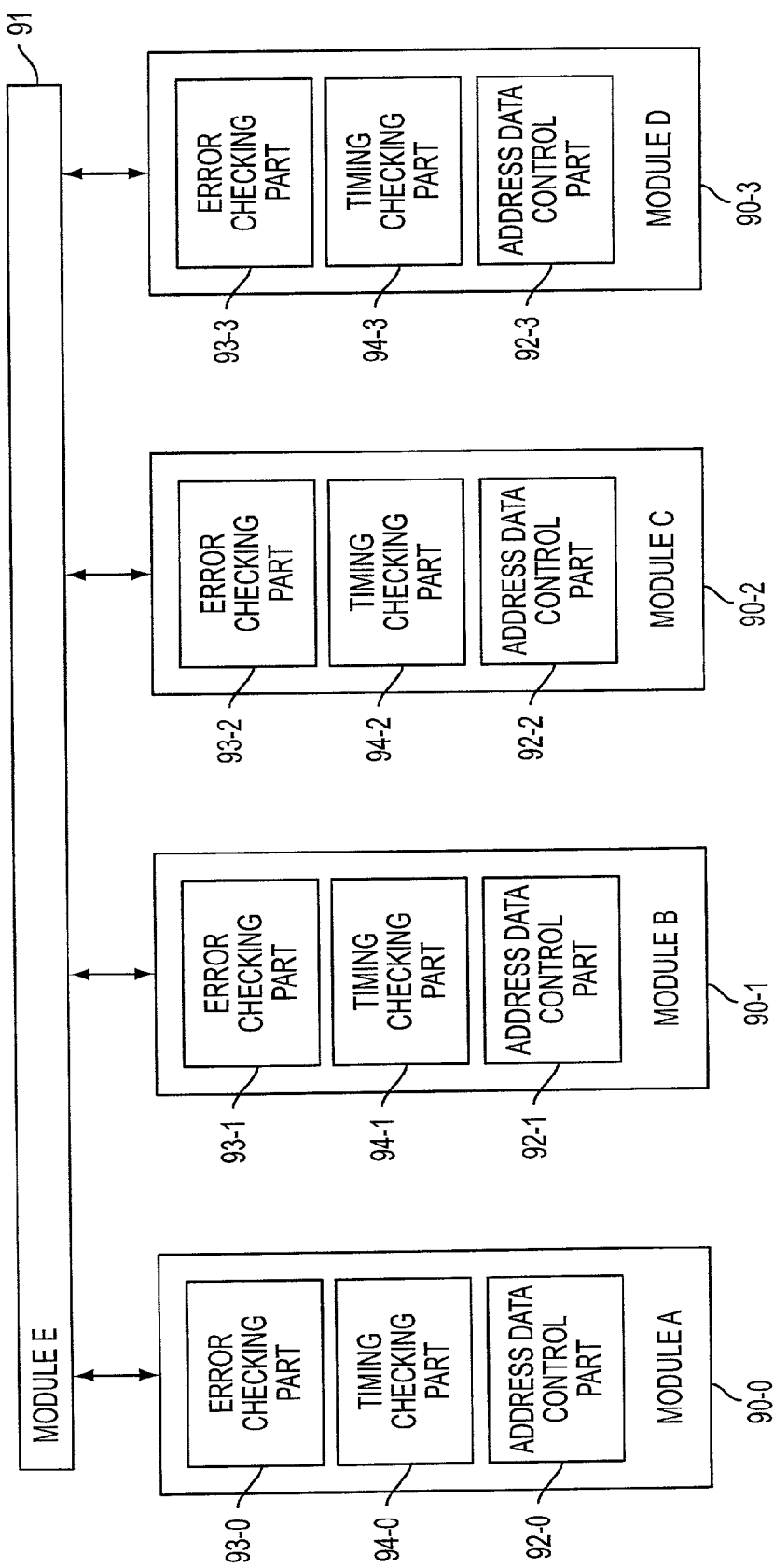
FIG. 12 is a block diagram showing a configuration of a multiprocessor system according to an embodiment of the present invention.

FIG. 12 is a block diagram showing a configuration of a multiprocessor system according to an embodiment of the present invention.

In FIG. 12, 90-0 to 90-3 are modules A, B, C and D having an identical configuration and 91 is module E, which mutually interconnects modules 90-0 to 90-3 and monitors the status of each module. Thus, a multiprocessor system is constructed by mutually interconnecting multiple modules.

Moreover, modules 90-0 to 90-3 are compatible with processor modules 60-0 to 60-3 of FIG. 6 and have identical configurations as those of the processor modules 60-0 to 60-3 and monitoring module 91 is compatible with snoop system controller SSC 63 of FIG. 6 and is configured identical to snoop system controller SSC 63.

Each of the modules 90-0 to 90-3 comprise address data control parts 92-0 to 92-3, error checking parts 93-0 to 93-3 and timing match checking parts 94-0 to 94-3. Other functions belonging to each module are abridged in this figure.

Address data control parts 92-0 to 92-3 perform the transmit address data, error checking parts 93-0 to 93-3 checks for errors in address data received from module 91 and transmit error detection signals.

The error detection signal is expressed with 2 bits as "00" if no errors have occurred in the address data and if an error has occurred in the address data, as "01" if no errors have occurred in the master ID and as "10" in the case that an error has occurred in the master ID.

Timing match checking parts 94-0 to 94-3 compare the timing of the error detection signal received from module 71 with the timing of the address information data and determine whether to retransmit the address data.

Monitoring module 91 has the capability to snoop the address data and the error detection signal transmitted from each of the modules 70-0 to 70-3 and transfer the address data to each of the modules 90-0 to 90-3 and the capability to transmit a signal indicating that the address information data has been broadcast normally to the transmission source module for the address information data.

In FIG. 12, the operation of a fourth embodiment is described with module D 90-3 as the address data transmission source module and module A90-0 as the address data transmission destination module.

First, when address data transmission source module D 90-3 transmits address information data from address data control part 92-3 to transmission destination module A90-0, error checking part 93-0 receives the address information data into its receiving buffer.

Error checking part 93-0 determines whether an error has occurred in the address information data and, if no communication errors have occurred and the transmission of the address information data has been performed normally, the error checking part 93-0 handles successive data communications. However, if it is determined that an error has occurred in the address information data, the error detected signal "01" is output.

Modules 90-1 to 90-3, which are those other than module 90-0 which received the error detection signal, compare the timing of the receiving the error detection signal and the timing of receiving the signal indicating whether the address information data transmitted from module E91 was broadcast normally using timing match checking parts 94-1 to 94-3, respectively and determine whether or not the timing for both is within a predetermined specified interval.

The specified interval between the timing of receiving the error detection signal and receiving the signal indicating whether the address information data transmitted from module E91 was broadcast normally is predetermined for each module, and its determination depends upon the length and performance of bus 41, which interconnects each of the modules.

Because the signal indicating whether the address information data transmitted from module 91 was broadcast normally is a notification regarding the address information data output from module 90-3, it is determined to match the specified interval only at timing match checking part 94-3.

Because of this, timing match checking part 94-3 of module 90-3 requests retransmission of the address signal to address data control part 92-3 and address data control part 92-3 retransmits the address signal.

Thus, even if communication errors occur during address data transmission between modules, the transmission source can also perform retries simply by indicating, with a signal, whether the address information data was broadcast normally to the module. Thus, system stoppage due to the occurrence of communication errors are kept to a minimum.

Figure 13:
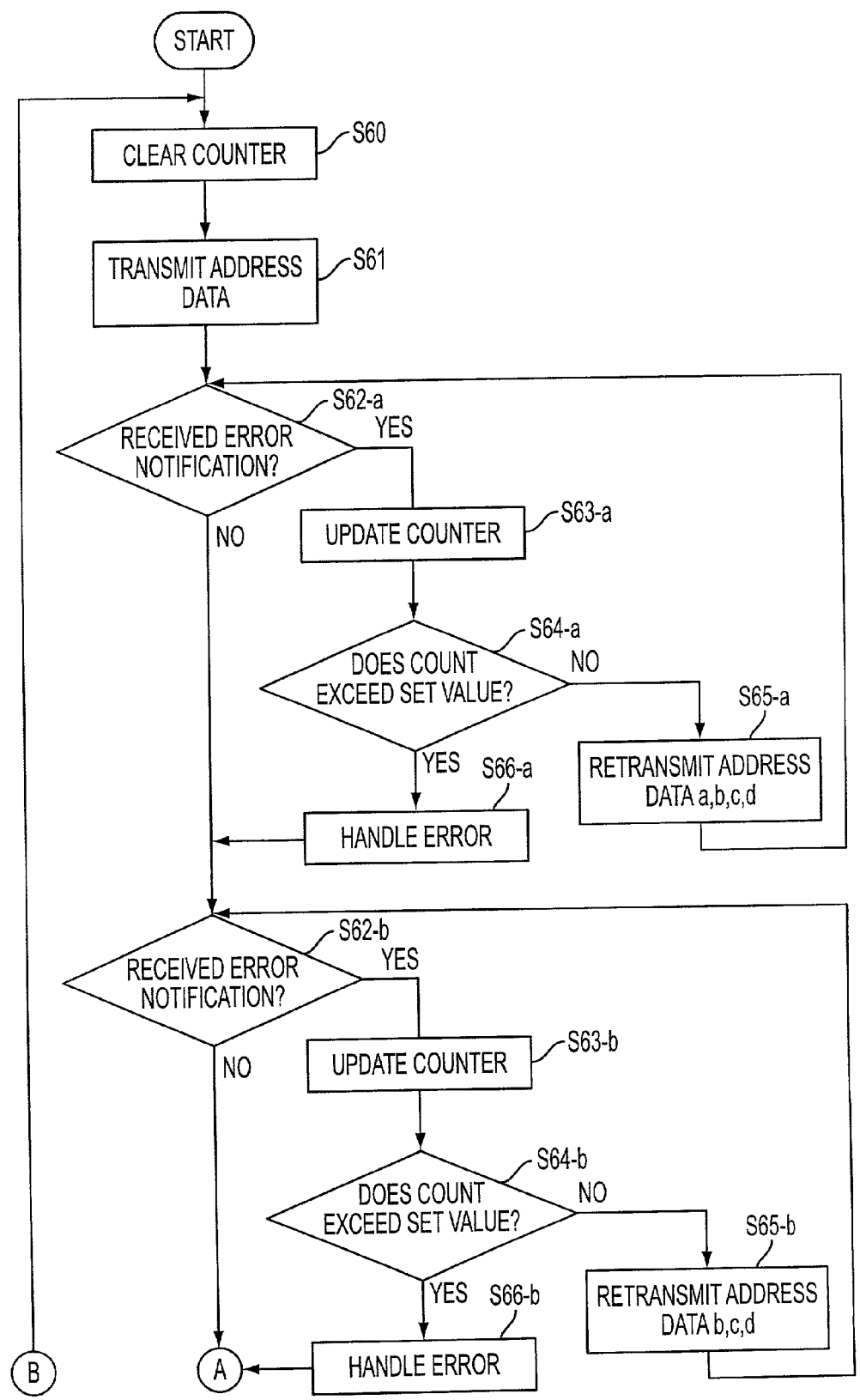
FIG. 13 is a flowchart showing operation of an address data transmission source module for an embodiment of the present invention.
Figure 14:
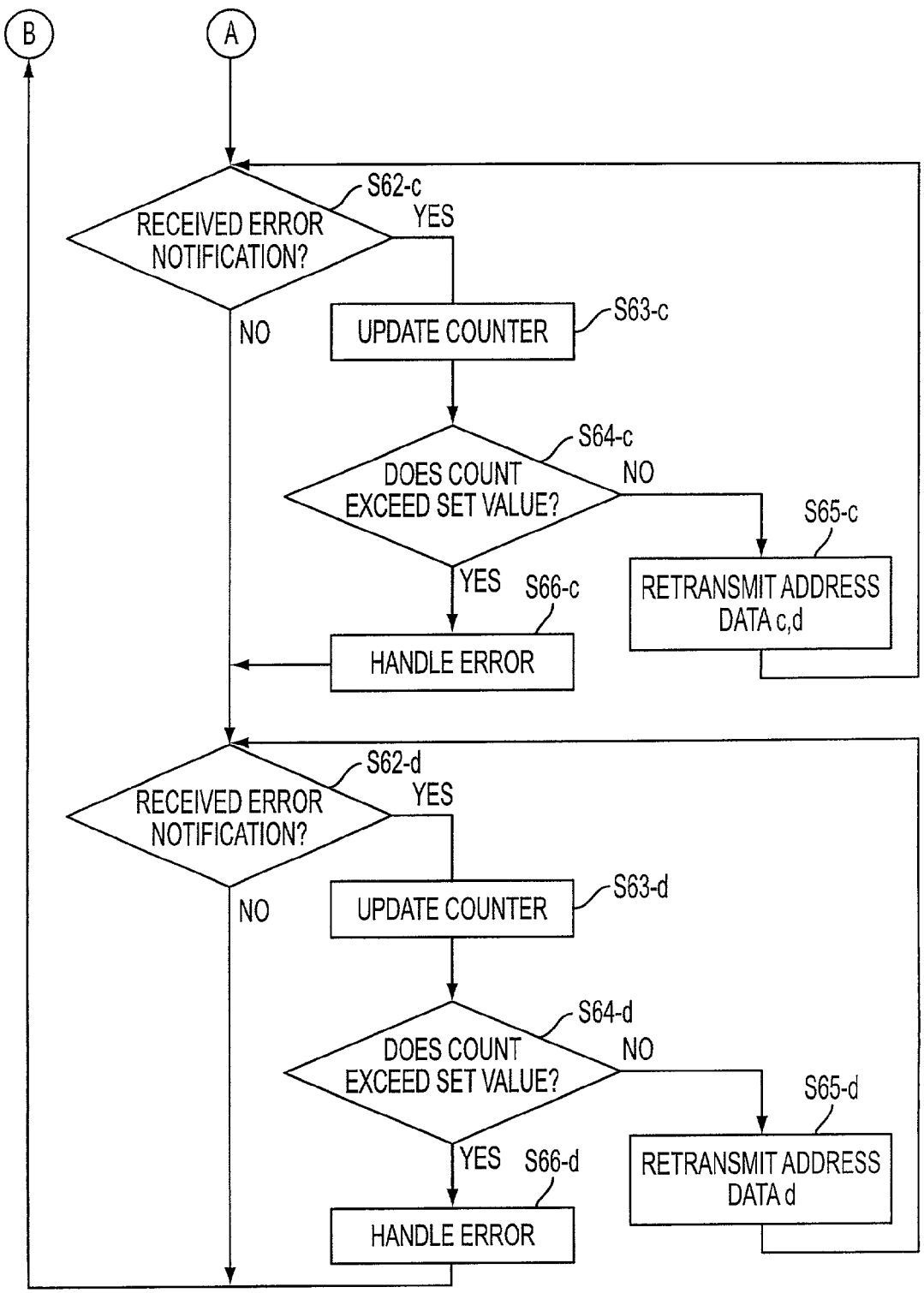
FIG. 14 is a flowchart showing an operation of an address data transmission source module for an embodiment of the present invention continued from FIG. 13.
Figure 15:
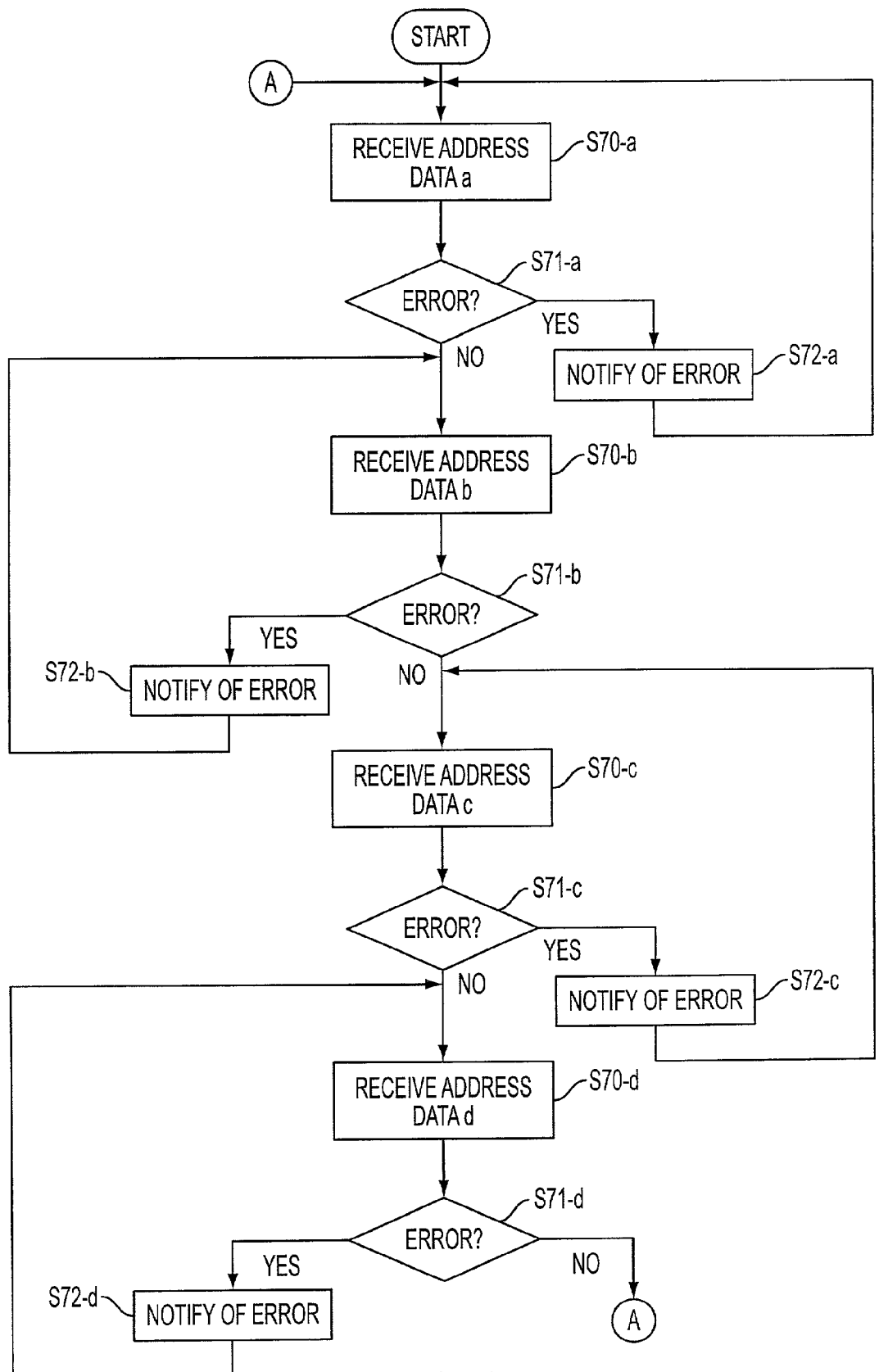
FIG. 15 is a flowchart showing an operation of an address data transmission destination module for an embodiment of the present invention.

FIG. 13 and FIG. 14 are flowcharts showing the operation of an address data transmission source module for a fifth embodiment of the present invention and FIG. 15 is a flowchart showing the operation of an address data transmission destination module for the fifth embodiment of the present invention.

The fifth embodiment has an added capability to output address data, at once, to devices on the transmission side of embodiments one through four or multiple address data to modules. The address data is output in the sequence a, b, c, d, which is the same sequence which is broadcast to each module.

In cases when an error notification is broadcast from the monitoring module, the module compares master IDs to determine whether the error notification is directed thereto, performs retransmission of the address after comparing command IDs to check which address data the error notification is indicating and, to maintain the transmission sequence, retransmits the ensuing address data in the same manner.

In addition, to prevent repeated retransmission handling without error restoration, i.e. correction, due to errors occurring on the address bus, the retry counters A, B, C and D are attached to each address data code and retransmission is stopped when the retry count exceeds a predetermined number of times.

At S60, as shown in FIG. 13, the module resets the value of all retry counters A, B, C and D to 0 and outputs address data in the sequence: a, b, c, d.

Next, at S62-a, the module determines whether an error notification signal "01" directed thereto relating to address data "a" has been received. At this time, the master ID in the address information data received is compared to its own module ID and, if these IDs match, it is determined whether the error notification signal "01" received is an error notification signal directed thereto.

If an error notification signal "01" directed thereto is not received by the module, when the transmission of address information data is being performed normally, the module proceeds to S62-b and determines whether an error notification signal "01" directed thereto relating to address data "b" has been received by the module.

On the other hand, if the module does receive an error notification signal "01" during S62-a, the operation proceeds to S63-a, updates the count of retry counter "A" by adding 1 thereto and, at S64-a, the module determines whether the count of retry counter "A" has reached a set value. If the count of retry counter "A" has reached the set value, retransmission handling is no longer performed and the operation proceeds to S62-b after performing error handling. However, if the count has not exceeded the set value, the operation proceeds to S65-a.

At S65-a, the address data a, b, c, and d is retransmitted and the operation is returned to S62-a.

In the following, the module handles address data in the same manner as in the sequence b, c, d (S62-b, S62-c, S62-d to S66-b, S66-c, S66-d).

At this time, at S65-b, address data b, c, and d is retransmitted and, at S65-c, address data c and d is retransmitted and, at S65-d, address data d is retransmitted.

As shown in FIG. 15, at S70-a, the module receives address data "a", at S71-a, it is determined whether there is an error in the address data "a" received and, if there is no error in address data "a", the operation proceeds to S70-b. However, if there is an error in address data "a", the operation proceeds to S72-a.

At S72-a, the module transmits an address error notification, returns to S70-a and repeats the aforementioned address data "a" receiving handling.

In the following, the module handles address data in the same manner as in the sequence b, c, d (S70-b, S70-c, S70-d to S72-b, S72-c, S72-d).

Accordingly, even if communication errors occur in any of a number of address data codes, it is possible to maintain the transmission sequence by retrying the ensuing address data. Further, not only is it possible to transmit a number of address data codes in sequence, it is also possible to repeat retries even if a malfunction occurs along the address bus, thereby limiting the system stoppages due to the occurrence of communication errors to a minimum.

Although the above-description is limited to using an ECC type circuit, it should be understood that the present invention is not limited to using an ECC type circuit. For example, adopting a parity check circuit type or other type of circuit configuration as an error detection circuit rather than an ECC type circuit is within the scope of the present invention.

Through the above description the following capabilities of the invention are disclosed:

(1) With an address bus which connects multiple data processing modules and outputs address data codes having at least a target address and a master ID indicating the transmission source: A first check bit regarding the overall address data code and a second check bit regarding the master ID alone are allocated to the address data code and, if an error in the overall address data code that cannot be corrected is detected by the address bus monitoring circuit using the first check bit, but no error is detected in the master ID using the second check bit, the address transmission source which received an error notification that can be retried from the error detection circuit from the snoop address within the predetermined time retransmits the address data.

(2) With an address bus which connects multiple data processing modules and outputs address data codes having at least a target address and a master ID indicating the transmission source: by effecting a notification indicating that an error that cannot be corrected was detected in output address data, within a predetermined period of time from a notification indicating that the address relating to the transmission source has been broadcast normally, the outputting source recognizes the error in the address it has transmitted and retransmits the address.

(3) In (1) of the foregoing, if a master ID error is detected using the second bit, a retrial impossible notification is made.

(4) In item (1) of the foregoing, if a master ID error that cannot be corrected is detected using the second bit, at the same time that a retrial impossible notification is transmitted, address transmission retries are suppressed by changing the snoop address data to a number that cannot be a master ID.

(5) In items (1) or (2) of the foregoing, if errors continue to occur even after repeating retries for a predetermined number of times, retries are stopped and error handling is initiated to treat the error as a retry impossible error.

(6) In items (1) to (5) of the foregoing, if besides the target address and master ID, the address data indicates that a single transmission source has issued multiple addresses, the module will wait for a command ID indicating the issuance sequence and a second check bit will be allocated for the master ID and the command ID.

(7) In item (6) of the foregoing, if a retry is issued at an address that precedes the same master, the ensuing address outputs are also considered retries.

(8) In item (7) of the foregoing, if a retry impossible error is notified at an address that precedes the same master, or if the number of retries of a retry impossible error exceeds a predetermined number, the ensuing address outputs are not considered retries and are output as they are.

As described in the above, the invention enables the continued operation of an overall system as much as possible even if un-restorable errors occur along an address bus.

In addition, further to this, with other inventions, even when it is necessary to stop a system, the situation can be accurately appraised and the causes of the failure can be correctly appraised.

What is claimed is:

1. A method of operating a data transfer device, comprising:
    transmitting address data;
    starting a counter;
    determining whether an error communication signal is received in response to transmitted address data; and
    comparing a timing of receiving the error communication signal with a timing of an interrupt signal transmitted when a predetermined time period has elapsed.

2. The method according to claim 1, further comprising clearing the counter if the timings do not match.

3. The method according to claim 1, further comprising:
    updating the counter by one if the timings match;
    determining whether the counter has reached a predetermined value; and
    stopping the data transfer device if the counter has reached the predetermined value.

4. The method according to claim 1, further comprising:
    updating the counter by one if the timings match; and
    re-transmitting the address data.

5. A data transmission device transmitting data, including a device address of the data transmission device, to at least one data receiving device, comprising:
    means for determining whether an error communication signal, transmitted from an intended data receiving device and received at the data transmission device, relates to data transmitted from the data transmission device in accordance with a match of a known time of data transmission from the data transmitting device to the intended data receiving device and an arrival time of the error communication signal at the data transmission device; and
    means, responsive to a match determination, for controlling retransmission of the previously transmitted data, including the address of the data transmission device, to the intended data receiving device.

6. The data transmission device recited in claim 5, wherein the data transmission device further comprises a timer which is reset and begins counting, in response to a command from the determining means at the time of transmitting the data to the intended data receiving device, and which terminates counting after a predetermined period of time and produces an interrupt output, interrupting operation of the determining means, the predetermined period of time being determined in accordance with a distance and signal transmission time along a transmission path connecting the data transmission device and the intended data receiving device, over which the data is transmitted from the data transmission device to the intended data receiving device and over which the error communication signal is transmitted from the data receiving device to the data transmission device.

7. The data transmission device recited in claim 5, further comprising:
    a detector detecting each successive occurrence of receipt of an error communication signal and accumulating a count for each such occurrence, up to a predetermined maximum count; and
    the determining means, in response to each count accumulation, retransmits the data including the address data to the intended data receiving device and, in response to the count accumulation reaching a predetermined maximum value, determines that the transmission of data to the intended data receiving device has failed and terminates further data transmissions thereto.

8. A data transmission device transmitting data, including a device address of the data transmission device, to at least one data receiving device, comprising:
    a controller determining whether an error communication signal, transmitted from an intended data receiving device and received at the data transmission device, relates to data transmitted from the data transmission device in accordance with a match of a known time of data transmission from the data transmitting device to the intended data receiving device and an arrival time of the error communication signal at the data transmission device; and
    a transmission device, responsive to a match determination by the controller, retransmitting previously transmitted data, including the address of the data transmission device, to the intended data receiving device.

9. The data transmission device recited in claim 8, wherein the data transmission device further comprises a timer which is reset and begins counting, in response to a command from the determining means at the time of transmitting the data to the intended data receiving device, and which terminates counting after a predetermined period of time and produces an interrupt output, interrupting operation of the controller, the predetermined period of time being determined in accordance with a distance and signal transmission time along a transmission path connecting the data transmission device and the intended data receiving device, over which the data is transmitted from the data transmission device to the intended data receiving device and over which the error communication signal is transmitted from the data receiving device to the data transmission device.

10. The data transmission device recited in claim 8, further comprising:

a detector detecting each successive occurrence of receipt of an error communication signal and accumulating a count for each such occurrence, up to a predetermined maximum count; and the controller, in response to each count accumulation, retransmits the data including the address data to the intended data receiving device and, in response to the count accumulation reaching a predetermined maximum value, determines that the transmission of data to the intended data receiving device has failed and terminates further data transmissions thereto.

11. A method of transmitting data, including a device address of a data transmission device, to at least one data receiving device, comprising:

determining whether an error communication signal, transmitted from an intended data receiving device and received at the data transmission device, relates to data transmitted from the data transmission device in accordance with a match of a known time of data transmission from the data transmitting device to the intended data receiving device and an arrival time of the error communication signal at the data transmission device; and in response to a match determination, controlling retransmission of the previously transmitted data, including the address of the data transmission device, to the intended data receiving device.

12. The data transmission method recited in claim 11, wherein the data transmission method further comprises determining elapsed time, from a time of transmitting the data to the intended data receiving device up to a predetermined period of time and thereupon producing an interrupt output, interrupting the determining, the predetermined period of time being determined in accordance with a distance and signal transmission time along a transmission path over which the data is transmitted from the data transmission device to the intended data receiving device and over which the error communication signal is transmitted from the data receiving device to the data transmission device.

13. The data transmission method in claim 11, further comprising:

detecting each successive occurrence of receipt of an error communication signal and accumulating a count for each such occurrence, up to a predetermined maximum count; and in response to each count accumulation, retransmitting the data including the address data to the intended data receiving device and, in response to the count accumulation reaching a predetermined maximum value, terminating further transmission of address data to the intended data receiving device.

* * * * *